(12) United States Patent
McLaughlin et al.

(10) Patent No.: US 8,985,646 B2
(45) Date of Patent: Mar. 24, 2015

(54) PRESSURE VESSEL SAFETY LOCK APPARATUS

(75) Inventors: Richard McLaughlin, Moline, IL (US); Cliff LaFrenz, Donahue, IA (US); Chris Gramling, Geneseo, IL (US)

(73) Assignee: Marco Group International, Inc., Davenport, IA (US)

( * ) Notice: Subject to any disclaimer, the term of this patent is extended or adjusted under 35 U.S.C. 154(b) by 134 days.

(21) Appl. No.: 13/598,873

(22) Filed: Aug. 30, 2012

(65) Prior Publication Data

US 2013/0062893 A1    Mar. 14, 2013

Related U.S. Application Data

(60) Provisional application No. 61/532,243, filed on Sep. 8, 2011.

(51) Int. Cl.

| | |
|---|---|
| *B65D 45/30* | (2006.01) |
| *F16J 13/24* | (2006.01) |
| *E05B 51/02* | (2006.01) |
| *E05B 65/00* | (2006.01) |
| *E05C 19/18* | (2006.01) |

(52) U.S. Cl.
CPC ............... *F16J 13/24* (2013.01); *E05B 51/02* (2013.01); *E05B 65/001* (2013.01); *E05C 19/18* (2013.01)
USPC ......................... 292/256.6; 292/256; 292/258

(58) Field of Classification Search
CPC ........ E05B 51/02; E05B 2051/02; F16J 13/24
USPC ......... 292/256, 256.5, 256.6, 256.65, 256.67, 292/256.71, 256.73, 256.75, 258
See application file for complete search history.

(56) References Cited

U.S. PATENT DOCUMENTS

| | | | |
|---|---|---|---|
| 1,958,923 A | | 5/1934 | Mohler |
| 3,077,360 A | | 2/1963 | Israel |
| 3,124,158 A | | 3/1964 | Penfold |
| 3,144,165 A | * | 8/1964 | Pegon et al. ................. 220/211 |
| 3,269,587 A | * | 8/1966 | Svenson ........................ 220/582 |
| 3,349,947 A | * | 10/1967 | Zumwalt ....................... 220/327 |
| 3,386,206 A | | 6/1968 | Loveless |
| 3,458,083 A | * | 7/1969 | Erwin, Jr. ..................... 220/316 |
| 3,547,298 A | | 12/1970 | Versluis |
| 4,219,125 A | * | 8/1980 | Wiltshire et al. ............ 220/4.13 |
| 4,267,940 A | * | 5/1981 | Wade ............................. 220/321 |
| 4,288,001 A | * | 9/1981 | Lankston ...................... 220/316 |
| 4,452,372 A | | 6/1984 | Robbins |
| 4,498,695 A | * | 2/1985 | Pardo ........................... 292/260 |

(Continued)

*Primary Examiner* — Kristina Fulton
*Assistant Examiner* — Christine M Mills
(74) *Attorney, Agent, or Firm* — Woodard, Emhardt, Moriarty, McNett & Henry LLP (57) ABSTRACT

The present disclosure provides a locking device for restricting access to a hatch of a pressure vessel, and, more specifically, a locking device that is responsive to the internal pressure in the pressure vessel so as to minimize the ability of one to open the hatch while the vessel is still pressurized. In some embodiments, the locking device comprises first and second portions of the locking device configurable between an open and a closed configuration and a pressure-responsive locking member in fluid communication with an outlet port of the pressure vessel and arranged to automatically retain the first and second portions in the closed configuration when the pressure inside of the pressure vessel is above a predetermined threshold, wherein in the closed configuration the first and second portions restrict manipulation of the hatch and/or a locking mechanism of the hatch.

20 Claims, 10 Drawing Sheets

(56) References Cited

U.S. PATENT DOCUMENTS

| | | | |
|---|---|---|---|
| 4,515,287 A * | 5/1985 | Baudoux et al. | 220/316 |
| 4,589,566 A * | 5/1986 | Rives et al. | 220/316 |
| 4,932,550 A * | 6/1990 | Moucha | 220/203.09 |
| 5,353,944 A * | 10/1994 | Davis et al. | 220/303 |
| 6,053,541 A * | 4/2000 | Harris | 292/33 |
| 6,085,935 A | 7/2000 | Malchow et al. | |
| 6,401,958 B1 * | 6/2002 | Foss et al. | 220/320 |
| 6,708,837 B2 | 3/2004 | Smith | |
| 6,886,709 B2 | 5/2005 | Smith | |
| 7,878,361 B2 | 2/2011 | Meindl et al. | |
| 2004/0245787 A1 * | 12/2004 | Quarberg | 292/228 |
| 2007/0194033 A1 * | 8/2007 | Dos Santos Junior | 220/912 |
| 2010/0072204 A1 | 3/2010 | Smith et al. | |

* cited by examiner

PRESSURE VESSEL SAFETY LOCK APPARATUS

CROSS-REFERENCE TO RELATED APPLICATION

This application claims the benefit of U.S. Provisional Application No. 61/532,243 filed Sep. 8, 2011, which is hereby incorporated by reference.

FIELD OF THE INVENTION

Aspects of the present disclosure deal with locking apparatus on pressure vessels.

BACKGROUND OF THE INVENTION

Pressure vessels for various purposes such as abrasive blasting typically have a fill hatch which is closed and locked when the vessel is under pressure, but which can be opened to add material to the pressure vessel and/or for interior inspection and work. While such hatches typically have locking mechanisms, there can be safety concerns if the locks are prematurely disengaged while the vessel is still pressurized. The present apparatus provides an automatic safety lock responsive to internal pressure in a pressure vessel or pressurized tank to minimize the ability to prematurely open the hatch.

SUMMARY OF THE INVENTION

The present apparatus provides an automatic safety lock responsive to internal pressure in a pressure vessel or pressurized tank to minimize the ability to open the hatch before the internal pressure has dropped below a desired threshold. In some aspects, the present disclosure provides a locking device for restricting access to a hatch of a pressure vessel, comprising: a first half portion and a second half portion mounted to each other at rearward ends and configurable between an open configuration and a closed configuration wherein in the closed configuration the first half portion and the second half portion are arranged to prevent the hatch of a pressure vessel from being opened; a pressure-responsive locking member comprising a cylinder assembly having a body portion and a reciprocating cylinder rod that is extendable from a retracted position to an extended position; wherein the pressure-response locking member fluidly communicates with an outlet port of the pressure vessel; and wherein the pressure-responsive locking member is arranged to automatically extend to retain the first and second half portions in the closed configuration when the pressure inside of the pressure vessel is above a predetermined threshold. In some embodiments, the locking device further comprises a latch plate that is pivotally mounted to said first half portion and configurable between an unlatched position and a latched position; wherein the latched position of the latch plate is arranged to retain the first and second half portions in the closed configuration; and wherein the pressure-responsive locking member is arranged to retain the first and second half portions in the closed configuration by preventing the latch plate from changing to an unlatched position.

In some embodiments, the present disclosure teaches a locking device for restricting access to a hatch of a pressure vessel, comprising: a first portion and a second portion coupled to each other and configurable between an open configuration and a closed configuration wherein in the closed configuration the first portion and the second portion are arranged to prevent the hatch of a pressure vessel from being opened; a pressure-responsive locking member comprising a cylinder assembly having a body portion and a reciprocating cylinder rod that is extendable from a retracted position to an extended position; a latch plate pivotally mounted to the first portion and configurable between an unlatched position and a latched position; wherein the latched position of the latch plate is arranged to retain the first and second portions in the closed configuration; wherein the pressure-response locking member fluidly communicates with an outlet port of the pressure vessel; and wherein the pressure-responsive locking member is arranged to automatically extend to retain the first and second portions in the closed configuration when the pressure inside of the pressure vessel is above a predetermined threshold. In some instances, the first and second portions are pivotally mounted to each other. Additionally, or alternatively, the first and second portions can be arranged to encircle the hatch of the pressure vessel in the closed configuration.

In some instances, the present disclosure describes a locking device mountable to a hatch of a pressure vessel, comprising: a first half portion and a second half portion mounted to each other at rearward ends and configurable between an open configuration and a closed configuration wherein in the closed configuration the first half and the second half are arranged to prevent the hatch of a pressure vessel from being opened; a pressure-responsive locking member comprising a cylinder assembly having a body portion and a reciprocating cylinder rod that is extendable from a retracted position to an extended position; and a latch plate pivotally mounted to the first half portion and configurable between an unlatched position and a latched position; wherein the latched position of the latch plate is arranged to retain the first and second half portions in the closed configuration; wherein the first and second half portions are pivotally mounted to each other and are arranged encircle the hatch of the pressure vessel in the closed configuration; wherein the pressure-response locking member fluidly communicates with an outlet port of the pressure vessel; and wherein the pressure-responsive locking member is arranged to automatically extend to retain the first and second half portions in the closed configuration when the pressure inside of the pressure vessel is above a predetermined threshold.

Further forms, objects, features, aspects, benefits, advantages, and embodiments of the present invention will become apparent from a detailed description and drawings provided herewith.

DESCRIPTION OF PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Pressure vessels for various purposes such as abrasive blasting typically have a fill hatch which is closed and locked when the vessel is under pressure, but which can be opened to add material to the pressure vessel and/or for interior inspection and work. In the drawings provided, the top of a pressure vessel or tank is shown with a hinged hatch which can be locked in a closed position using a set of cam lock devices positioned around the periphery of the hatch. In many instances, the cam lock devices used to lock the hatch in a closed position are operated by rotating levers of the cam lock devices away from the hatch. While hatches of pressure vessels typically have locking mechanisms, there can be safety concerns if the locks are prematurely disengaged while the vessel is still pressurized.

Embodiments of the present disclosure comprise an apparatus that provides an automatic safety lock responsive to internal pressure in a pressure vessel or pressurized tank to minimize the ability to open the hatch before the internal pressure has dropped below a desired threshold.

In some embodiments of the present disclosure, the safety apparatus includes at least two portions mounted and/or coupled to each other and configurable between an open configuration and a closed configuration. For example, the safety apparatus may include semi-circular pieces which are hinged at one side, such as at rearward ends. The semi-circular pieces can be placed around the hatch in a "clam shell" arrangement and locked together at their non-hinged ends to secure the clam shell in place. When in place, the clam shell physically prevents the cam locking device levers from being moved into an unlocked position and/or prevents the hatch from being opened.

As one locking mechanism, the clam shell can include aligned holes on a latch plate and flange of a semi-circular piece and/or aligned holes on flanges of the semi-circular pieces which can be locked together using a padlock or a tag out device to prevent or warn against opening of the clam shell other than by an authorized, properly trained person.

A second locking mechanism includes a pressure actuated cylinder positioned on and/or behind a latch plate capable of retaining the portions of the clam shell in a closed configuration. In some instances, the pressure actuated cylinder is fluidly coupled to the interior volume defined by the pressure vessel. For example, the cylinder can be fed by a pressure hose or line from an output port of the pressure vessel so that the pressure in the line corresponds to the pressure in the vessel. Preferably, when the pressure inside the vessel and line exceeds a selected threshold, such as one pound per square inch (1 PSI) the cylinder rod is in or moves to an extended position, and engages a pair of openings in the latch plate and on the clam shell to prevent the latch plate from being opened to unlock the clam shell. When the pressure in the vessel is below the desired threshold, the cylinder rod is retracted and disengages from the latch plate and clam shell to allow the clam shell to be opened, if there are no other locking members such as a manual locking member (e.g., a padlock) locking the portions of the clam shell together. In some instances, a biasing member is used to automatically retract and disengage the cylinder rod from the latch plate.

An example embodiment of the safety lock apparatus is illustrated in FIGS. 1-9. FIGS. 1-3B schematically illustrate system 10 including locking device 50 and the top portion of a pressure vessel such as tank 20. Tank 20, as illustrated by itself in FIG. 2, includes tank body 22 and a hatch 30, for example on the upper portion. Hatch 30 is typically hingedly mounted to tank body 22 and when closed can be locked in place with locking mechanisms 34 such as cam lever arm arrangements. Tank body 22 includes an outlet port or fixture 24 in communication with the internal pressure of tank 20.

Figure 1:
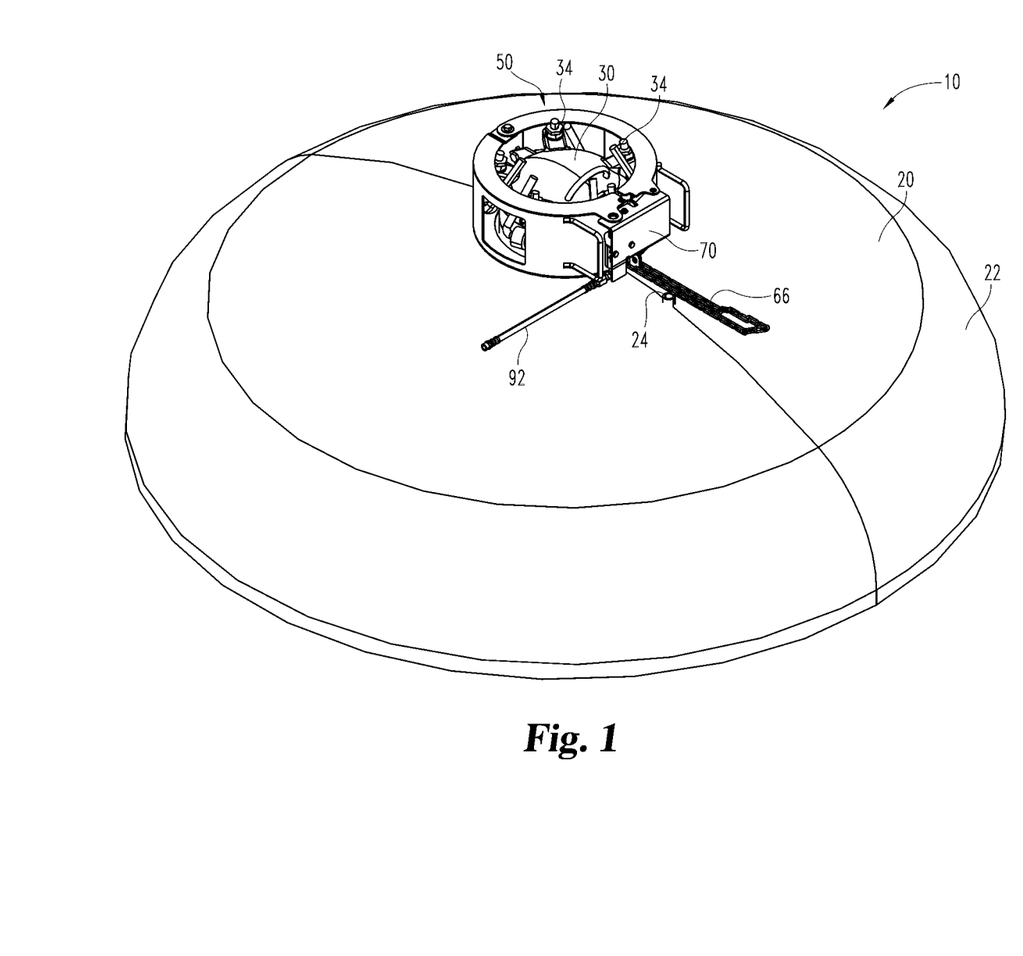
FIG. 1 is a perspective schematic view of a locking apparatus and pressure vessel system according to an embodiment herein.
Figure 2:
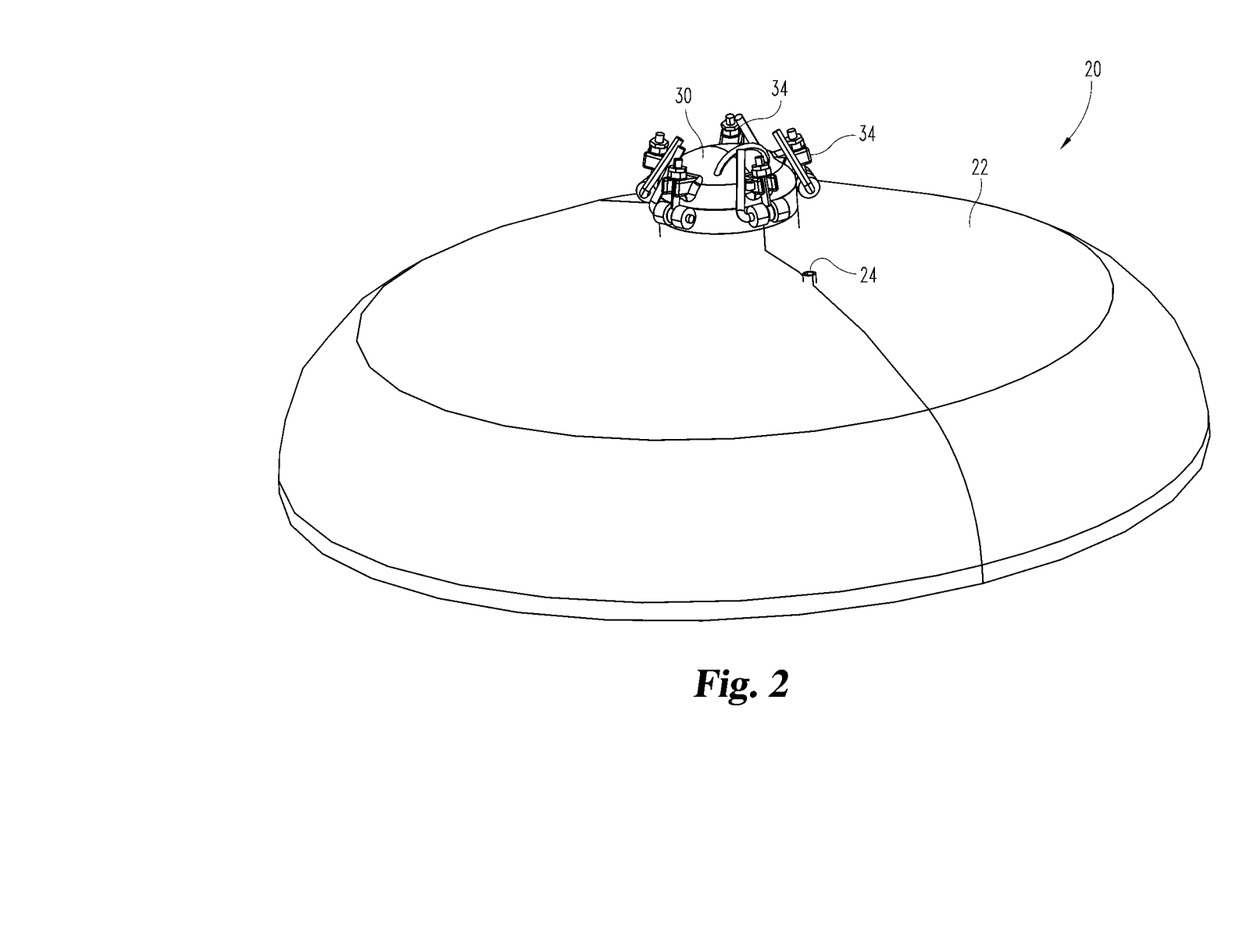
FIG. 2 is a perspective schematic of an upper portion of the pressure vessel of FIG. 1.
Figure 3A:
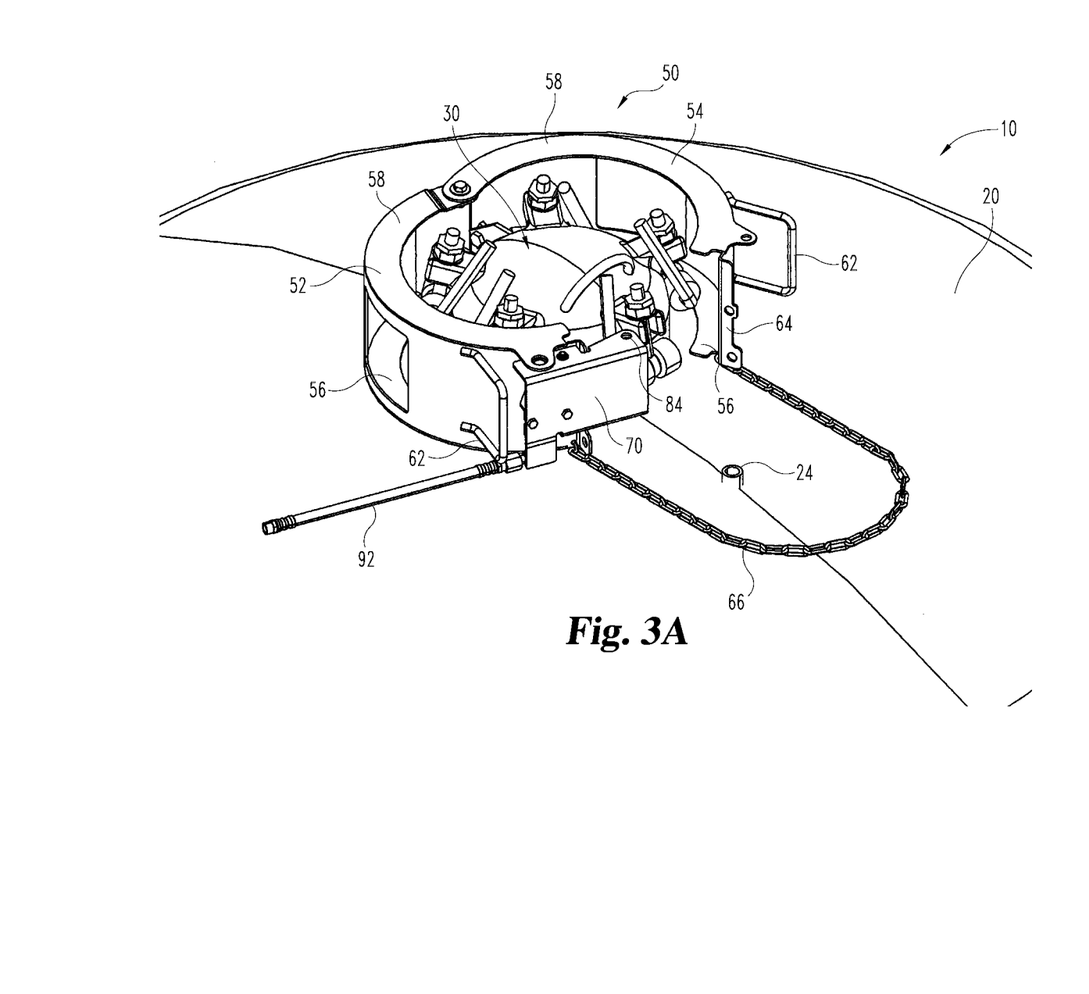
FIG. 3A is a perspective view of the system of claim 1 with the locking apparatus in an open portion.
Figure 3B:
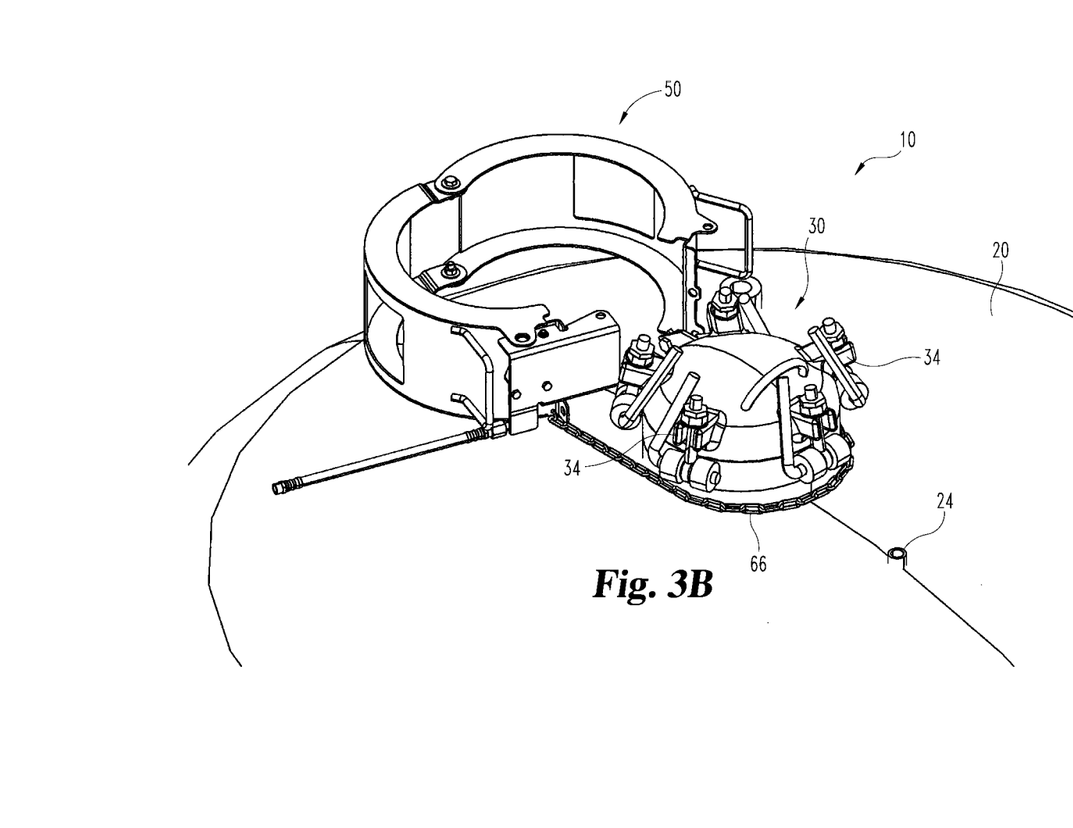
FIG. 3B is a perspective view of the system of claim 1 with the locking apparatus moved away from the hatch.
Figure 4:
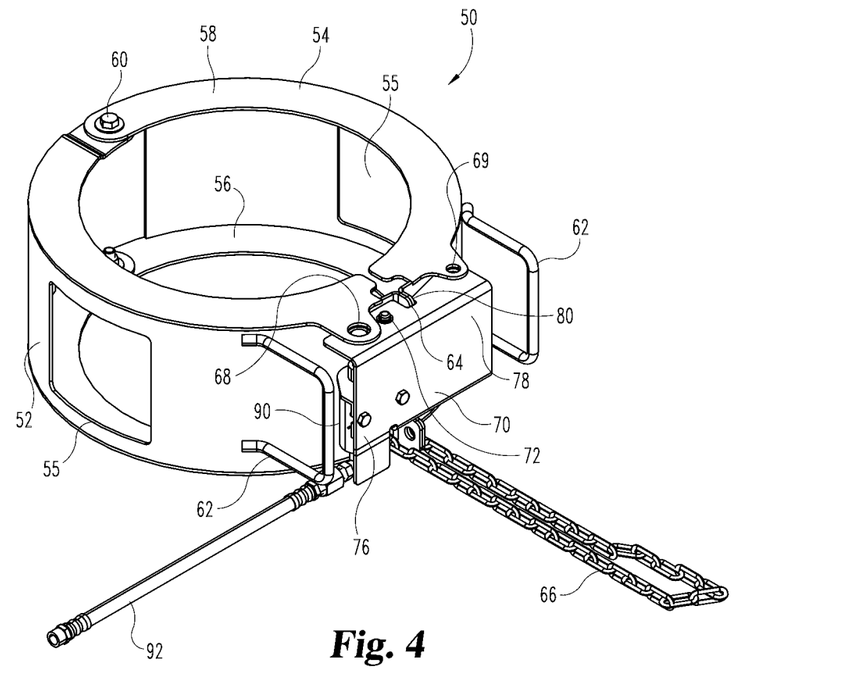
FIG. 4 is an upper, perspective view of the locking apparatus of FIG. 1.
Figure 5:
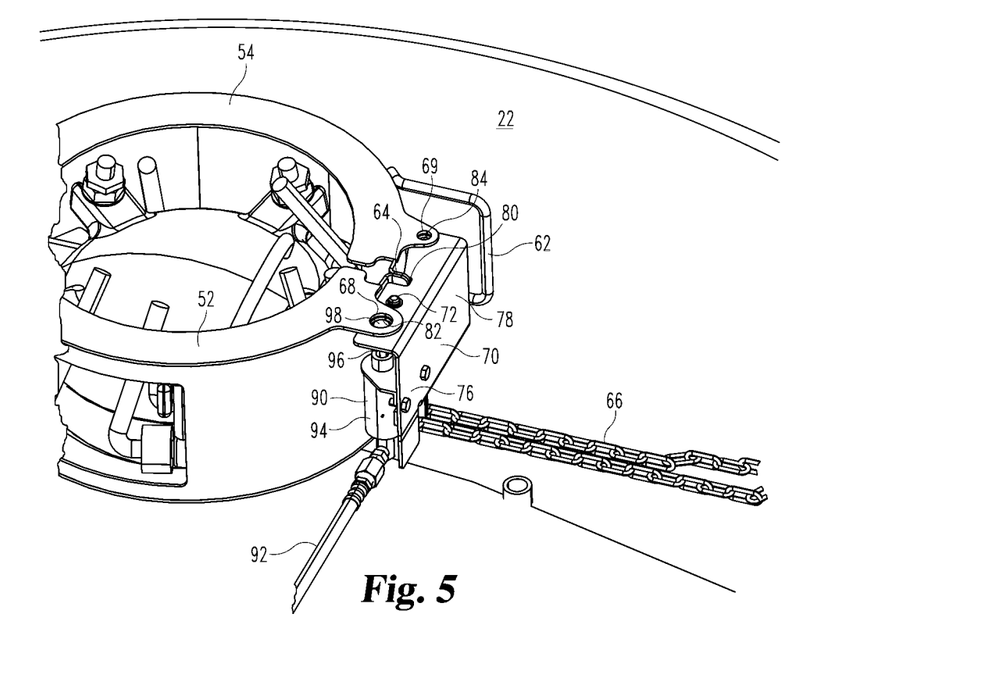
FIG. 5 is a left view of the locking apparatus of FIG. 1.
Figure 6:
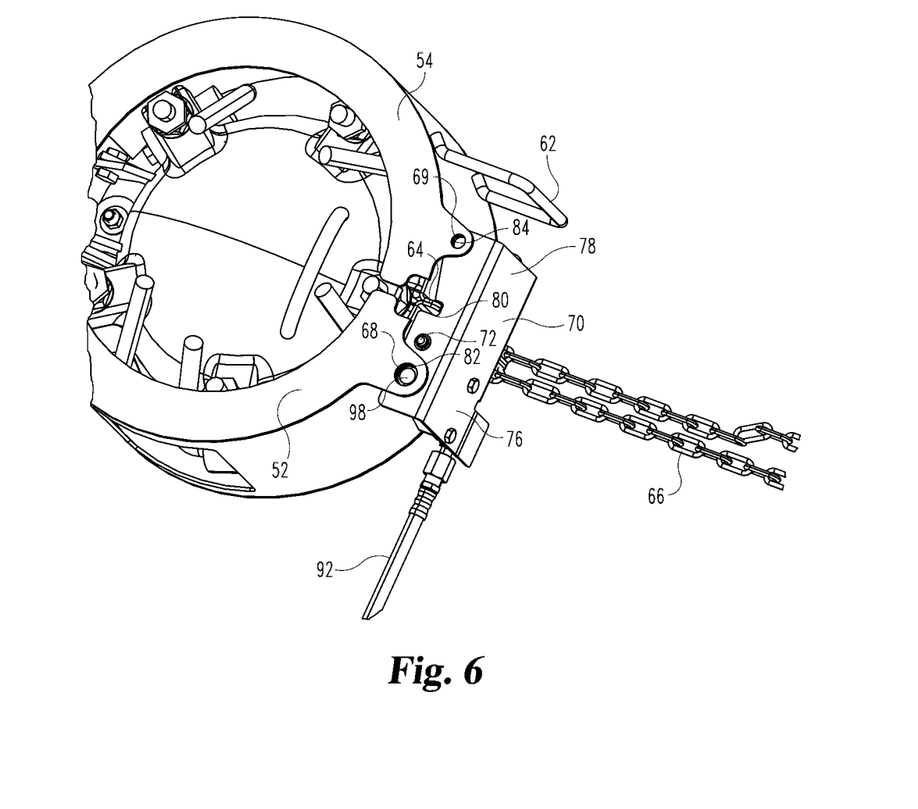
FIG. 6 is a top view of the locking apparatus of FIG. 1.
Figure 7:
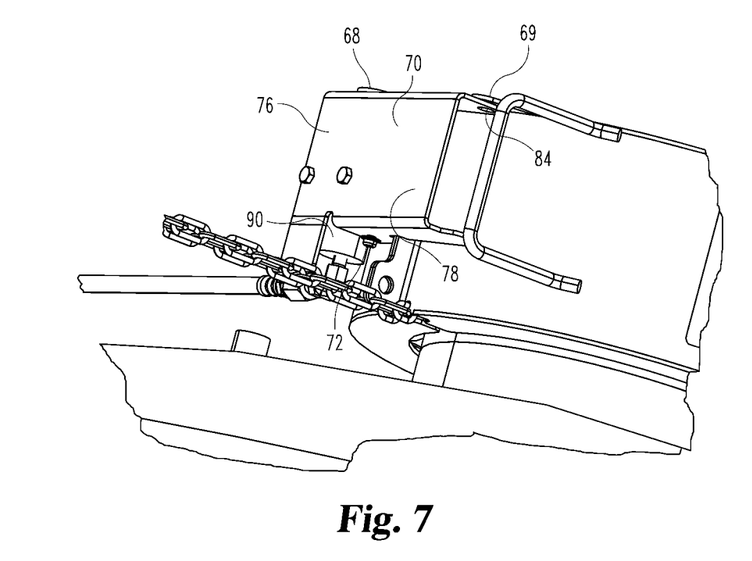
FIG. 7 is a right, lower view of the locking apparatus of FIG. 1.
Figure 8:
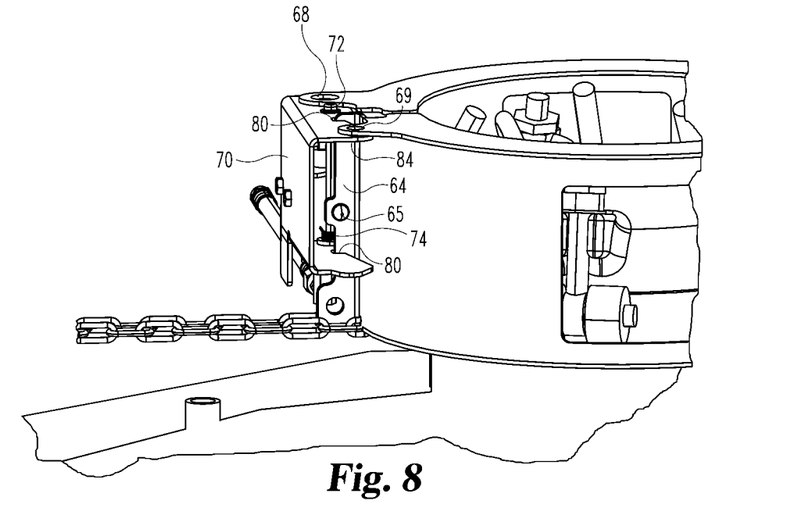
FIG. 8 is a right view of the locking apparatus of FIG. 1.
Figure 9:
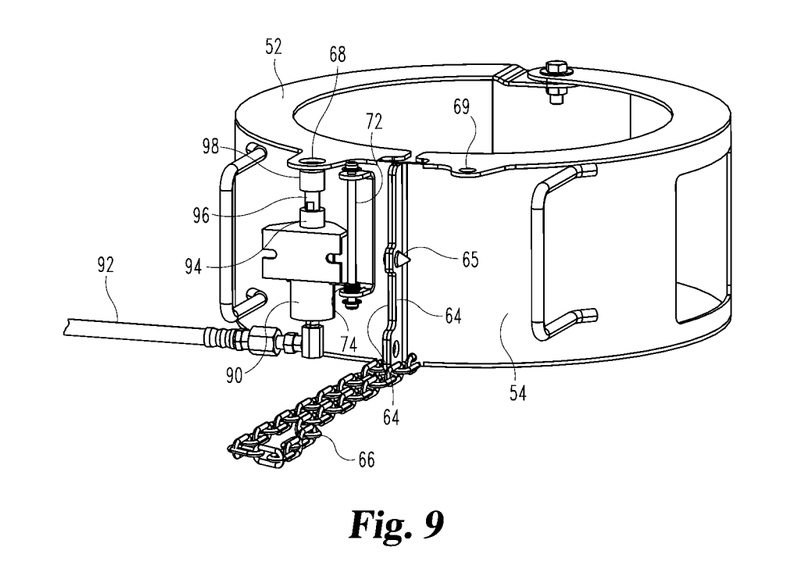
FIG. 9 is a front view of the locking apparatus of FIG. 1 with the locking plate removed for illustration purposes.

Locking device 50 is illustrated in FIGS. 1, 3A and 3B as a clam shell arrangement that is configurable between an open configuration and a closed configuration and which is capable of encircling hatch 30 and locking mechanisms 34 when closed. In the closed position of FIG. 1, locking device 50 inhibits hatch 30 from being unlocked or opened. When desired, locking device 50 can be unlocked and opened into the open position to be moved away from hatch 30 as illustrated in FIGS. 3A and 3B, allowing access to unlock and open the hatch.

Optionally yet preferably, an elongate tethering member, such as chain 66, is attached to locking device 50. In some instances, the elongate tethering member extends from a first portion to a second portion of the clam shell arrangement. In some instances, the apparatus is arranged so that the locking device and elongate tethering member, e.g., chain 66, encircle hatch 30 even when the clam shell is in the open position, and chain 66 retains locking device 50 from falling or sliding off the top of tank 20.

Shown in further detail in FIGS. 4-9, locking device 50 is formed of a clam shell arrangement having two semicircular halves 52 and 54 which are pivotally mounted to each other at their rearward ends, for example using hinge pins 60. Each half includes a lower inward extending flange 56 and an upper inward extending flange 58 which help enclose hatch 30 and prevent undesired removal of locking device 50 from the hatch. The locking device halves preferably include handles 62 to assist a user in pulling the forward ends together or apart. Handles 62 are not shown in all figures for ease of reference.

The locking device halves 52 and 54 may also include cut out portions 55 to allow the device to be mounted in selected positions to provide optimal access for an operator, as well as to facilitate viewing of hatch 30 and locking mechanism 34 and/or to reduce the overall weight of device 50. In some instances, cut out portions 55 can be arranged to receive portions of locking mechanisms 34 so as to limit relative movement between device 50 and hatch 30, such as rotational movement of device 50 around the hatch 30.

In some instances, the forward ends of halves 52 and 54 preferably include matching forward flanges 64 which meet in a complimentary arrangement when the locking device is in the closed position. Optionally, one or more alignment guides such as pin 65 (see FIG. 9) can interact between the two forward flanges 64 to assist in ensuring proper alignment. Also, in some embodiments, ends of the elongate tethering member, such as the two ends of chain 66, are mounted to the two halves 52 and 54 adjacent the lower edges of flanges 64.

In some embodiments, device 50 comprises a locking or latch plate 70, that is arranged to retain the first and second portions of the clam shell arrangement in a closed configuration. For example, latch plate 70 can be positioned on the first or second portion of device 50 opposite of the hingedly coupled ends. In some embodiments, latch plate 70 preferably is pivotally mounted to half 52 via pivot pin 72.

Latch plate 70 includes a vertical front surface and is shown with substantially horizontal upper and lower plate sides. Optionally but preferably, latch plate 70 is biased to a closed position (seen as counterclockwise around pin 72 in FIG. 4) with a biasing member such as spring 74. In some instances, latch plate 70 includes proximal end 76 adjacent half 52 and distal end 78 which extends and overlaps with half 54 when the locking device is in the closed position.

In some embodiments, latch plate 70 includes one or more notches such as locking slots 80 in the upper and lower plate sides which receive and engage forward flanges 64 of the first and second portions of the clam shell arrangement, such as halves 52 and 54, when plate 70 is in the closed position and the first and second portions of the clam shell arrangement are in the closed configuration. Slots 80 have opposing sides parallel to and engaging flanges 64 that prevent separation of the flanges and thus prevent opening of locking device 50 when the latch plate is in the closed position. When latch plate 70 is in the open position (moved clockwise around pin 72 in FIG. 4), slots 80 are disengaged from forward flanges 64, allowing halves 52 and 54 to be pivotally opened and closed. Optionally, the inner facing edges of the side plates along distal end 78 can be tapered to assist the sliding of forward flange 64 on half 54 into position and into slot 80 when locking device 50 is being moved to the closed position. Latch plate 70 is preferably biased to the closed position by spring 74 on pin 72 so as to automatically engage forward flanges 64 and lock the first and second portions of the clam shell into the closed configuration.

In some instances, the locking device comprises multiple locking points, such as one for a pressure-responsive locking member and one for a manual locking member. In the illustrated embodiment, a portion of device 50, such as half 54, includes a tab portion which protrudes forward and defines manual locking hole 69. In the closed position, manual locking hole 69 extends over and is aligned with manual locking hole 84 defined in the upper side plate of distal end 78. When desired, a manual locking piece such as a padlock, a tamper resistant tag, a bolt, a wire, zip tie or similar piece can be inserted through manual locking holes 69 and 84 to prevent plate 70 from being moved to an open position. The manual locking piece is preferably selectively removable by a system operator when desired. In preferred embodiments a manual lock is used in addition to the pressure operated lock discussed below, but optionally the pressure operated lock can be used without a manual lock.

Similarly, the locking device may have a locking point for the pressure-responsive locking member. For example, half 52 includes a tab portion extending forward over proximal end 76 of plate 70 and defining a cylinder lock hole 68. Cylinder lock hole 68 is aligned with a cylinder lock hole 82 defined in the upper side plate of proximal end 76 of plate 70 when plate 70 and halves 52 and 54 are in the closed position. In some instances, however, cylinder lock hole 68 is aligned with a cylinder lock hole of half 54 when the halves 52 and 54 are in the closed configuration. Mounted below and in alignment with the cylinder locking holes is cylinder assembly 90, illustrated as mounted to the inner surface of distal end 76, between plate 70 and half 52. Cylinder assembly 90 and cylinder lock holes 68 and 82 form a pressure activated locking apparatus.

In several embodiments, cylinder assembly 90 includes body portion 94 mounted to distal end 76 and an internal, reciprocating cylinder rod 96. Cylinder rod 96 includes an upper locking end 98, which optionally includes a protective cap. Pressure input line 92 extends from a first tank end in pressurized communication with the volume defined by tank 20, for example via port 24, to a second end attached to cylinder body 94. When pressure is applied through input line 92 and exceeds a set threshold amount, rod 96 extends, i.e. translates upward, from body 94 so that the rod 96 and locking end 98 extends into and/or through both cylinder locking holes 68 and 82. Preferably cylinder assembly 90 is internally biased to return rod 96 to its lowered or disengaged position when the pressure supplied through input line 92 is below the selected pressure threshold. In the extended position, rod 96 and locking end 98 prevent plate 70 from being rotated into an open position and correspondingly prevents halves 52 and 54 from being moved to an open position. Directional references herein, such as upward or downward, are examples not intended to limit the orientation of other embodiments.

In operation, locking device 50 can be opened and disengaged from hatch 30 when access is desired to tank 20, generally when the pressure vessel is at atmospheric pressure. Upon closing and locking of hatch 30, locking device 50 is arranged so that halves 52 and 54 encircle hatch 30 and in the closed position the halves prevent unlocking and opening of hatch 30. When the halves are moved to the closed position, forward flanges 64 of halves 52 and 54 abut and are preferably aligned with each other. In pressing the halves together, the proximal end 78 of plate 70 extends over the forward portion of half 54 while plate 70 is rotated to an open or partially open position against the biasing of spring 74. When forward flanges 64 are fully abutted and aligned, plate 70 is rotated to the closed position, capturing flanges 64 within locking slots 80. An operator may then use a manual locking mechanism to lock plate 70 into the closed position through aligned manual locking holes 84 and 69.

Pressure may then be introduced into tank 20 via pressure supply means (not shown). As pressure is supplied to and builds within tank 20, pressure builds through outlet port 24 which is preferably connected to input line 92. Input line 92 carries the pressure to cylinder assembly 90. When the tank pressure exceeds a preset threshold, such as 1 psi, the pressure causes cylinder rod 96 to extend from cylinder body 90 such that rod 96 and locking end 98 engage cylinder locking holes 82 and 68. This provides a pressure responsive locking function that prevents unlocking of plate 70 and thus prevents unlocking of device 50. Operations using the pressurized vessel or tank can then be commenced as desired for an appropriate purpose. Locking device 50 operates to prevent opening of hatch 30 while tank 20 is under pressure either during use or prematurely during a venting process.

The manual locking piece is preferably only removed when pressure inside the tank is at a safe condition and preferably by an authorized and appropriately trained person. However, to avoid accidents if the manual locking device is removed prematurely, cylinder assembly 90 provides an automated locking device which is directly responsive to pressure inside the tank. Cylinder 90 operates to effectively automatically lock and unlock locking device 50 and prevents premature unlocking of the device, even if the manual locking device has been removed, so long as the pressure in the tank exceeds the set threshold.

Advantageously, cylinder 90 can signal when the internal pressure drops below the desired threshold by the retraction of locking end 98. Optionally, locking end 98 may include indicia to signal the position of locking end 98 more easily, for example with a red or orange cap which is visible above or through locking hole 68 when locking end 98 is extended.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A locking device for restricting access to a hatch of a pressure vessel, comprising:
   a first half portion and a second half portion mounted to each other at rearward ends and configurable between an open configuration and a closed configuration wherein in said closed configuration said first half portion and said second half portion are arranged to encircle a hatch locked with cam locks and to prevent handles of the cam locks from being moved into an unlocked position, so as to prevent the hatch of the pressure vessel from being opened;
   a pressure-responsive locking member comprising a cylinder assembly having a body portion and a reciprocating cylinder rod that is extendable from a retracted position to an extended position;
   wherein said pressure-responsive locking member fluidly communicates with an outlet port of the pressure vessel;
   wherein said pressure-responsive locking member is arranged to automatically extend to retain said first and second half portions in said closed configuration when the pressure inside of the pressure vessel rises above a predetermined threshold;
   wherein said first and second half portions in said closed configuration encircle and enclose the cam locks and are arranged to prevent the handles of the cam locks from being moved into an unlocked position; and
   wherein the first and second half portions have inward extending flanges that extend above and below the cam locks to encircle and enclose the cam locks.

2. The locking device of claim 1, wherein:
   said first and second half portions are pivotally mounted to each other.

3. The locking device of claim 1, further comprising:
   a latch plate pivotally mounted to said first half portion and configurable between an unlatched position and a latched position;
   wherein said latched position of said latch plate is arranged to retain said first and second half portions in said closed configuration; and
   wherein said pressure-responsive locking member is arranged to retain said first and second half portions in said closed configuration by preventing said latch plate from changing to an unlatched position.

4. The locking device of claim 1, further comprising:
   a biasing member biasing said reciprocating cylinder rod into said retracted position when the pressure inside of the pressure vessel falls below the predetermined threshold.

5. The locking device of claim 1, further comprising:
   a first flange of said first half portion arranged to abut a second flange of said second half portion when said first and second half portions are in said closed configuration; and
   a notch defined by a latch plate and arranged to receive said first and second flanges.

6. The locking device of claim 1, wherein:
   said pressure-responsive locking member is mounted to a latch plate.

7. The locking device of claim 1, wherein:
   said pressure-responsive locking member is shielded behind a latch plate.

8. The locking device of claim 1, further comprising:
   a first locking point of said locking device engaged by said reciprocating cylinder rod of said pressure-responsive locking member; and
   a second locking point of said locking device arranged for engagement by a manual locking member to retain said first and second half portions in said closed configuration.

9. The locking device of claim 1, further comprising:
   an elongate tethering member extending from said first half portion to said second half portion;
   wherein said elongate tethering member in combination with said first and second half portions encircles the hatch to retain said locking device in proximity to the hatch when said first and second half portions are in said open configuration.

10. A locking device for restricting access to a hatch of a pressure vessel, comprising:
    a first portion and a second portion coupled to each other and configurable between an open configuration and a closed configuration wherein in said closed configuration said first portion and said second portion are arranged to prevent levers of cam locks used to lock the hatch from being moved into an unlocked position, so as to prevent the hatch of a pressure vessel from being opened;
    a pressure-responsive locking member comprising a cylinder assembly having a body portion and a reciprocating cylinder rod that is extendable from a retracted position to an extended position;
    a latch plate pivotally mounted to said first portion and configurable between an unlatched position and a latched position;
    wherein said latched position of said latch plate is arranged to retain said first and second portions in said closed configuration;
    wherein said pressure-responsive locking member fluidly communicates with an outlet port of the pressure vessel; and
    wherein said pressure-responsive locking member is arranged to automatically extend the cylinder rod to couple said latch plate to said first portion or said second portion to retain said first and second portions in said closed configuration by preventing said latch plate from changing to an unlatched position when the pressure inside of the pressure vessel rises above a predetermined threshold.

11. The locking device of claim 10, wherein:
    said first and second portions are pivotally mounted to each other.

12. The locking device of claim 10, wherein:
    said first and second portions are arranged to encircle the hatch of the pressure vessel in said closed configuration.

13. The locking device of claim 10, further comprising:
    a biasing member biasing said reciprocating cylinder rod into said retracted position when the pressure inside of the pressure vessel falls below the predetermined threshold.

14. The locking device of claim 10, further comprising:
a first flange of said first portion arranged to abut a second flange of said second portion when said first and second portions are in said closed configuration; and
a notch defined by said latch plate and arranged to receive said first and second flanges.

15. The locking device of claim 10, wherein:
said pressure-responsive locking member is mounted to said latch plate.

16. The locking device of claim 10, wherein:
said pressure-responsive locking member is shielded behind said latch plate.

17. The locking device of claim 10, further comprising:
a first locking point of said locking device engaged by said reciprocating cylinder rod of said pressure-responsive locking member; and
a second locking point of said locking device arranged for engagement by a manual locking member to retain said first and second portions in said closed configuration.

18. The locking device of claim 10, further comprising:
an elongate tethering member extending from said first portion to said second portion;
wherein said elongate tethering member in combination with said first and second portions encircles the hatch to retain said locking device in proximity to the hatch when said first and second portions are in said open configuration.

19. A locking device mountable to a hatch of a pressure vessel, comprising:
a first half portion and a second half portion mounted to each other at rearward ends and configurable between an open configuration and a closed configuration wherein in said closed configuration said first half portion and said second half portion are arranged to prevent the hatch of a pressure vessel from being opened;
a latch plate pivotally mounted to said first half portion and configurable between an unlatched position and a latched position;
wherein said latched position of said latch plate is arranged to retain said first and second half portions in said closed configuration;
a pressure-responsive locking member mounted to said latch plate and comprising a cylinder assembly having a body portion and a reciprocating cylinder rod that is extendable from a retracted position to an extended position;
wherein said first and second half portions are pivotally mounted to each other at the rearward ends and are arranged to encircle the hatch of the pressure vessel in said closed configuration;
an elongate tethering member extending from a forward end of said first half portion to a forward end of said second half portion, said forward ends of said first and second half portions being opposite said pivotally mounted rearwards ends of said first and second half portions;
wherein said pressure-responsive locking member fluidly communicates with an outlet port of the pressure vessel; and
wherein said pressure-responsive locking member is arranged to automatically extend the cylinder rod to couple said latch plate to said first portion or said second portion to retain said first and second half portions in said closed configuration by preventing said latch plate from changing to an unlatched position when the pressure inside of the pressure vessel is above a predetermined threshold.

20. The locking device of claim 19, further comprising:
a hose extending from a first end to a second end, the first end coupled to said pressure-responsive locking member and the second end arranged to connect to an outlet port of the pressure vessel.

* * * * *